April 28, 1959 H. C. WYNNE ET AL 2,883,799
MANUFACTURE OF OPAQUE GLASS IN RIBBON FORM
Filed June 5, 1952
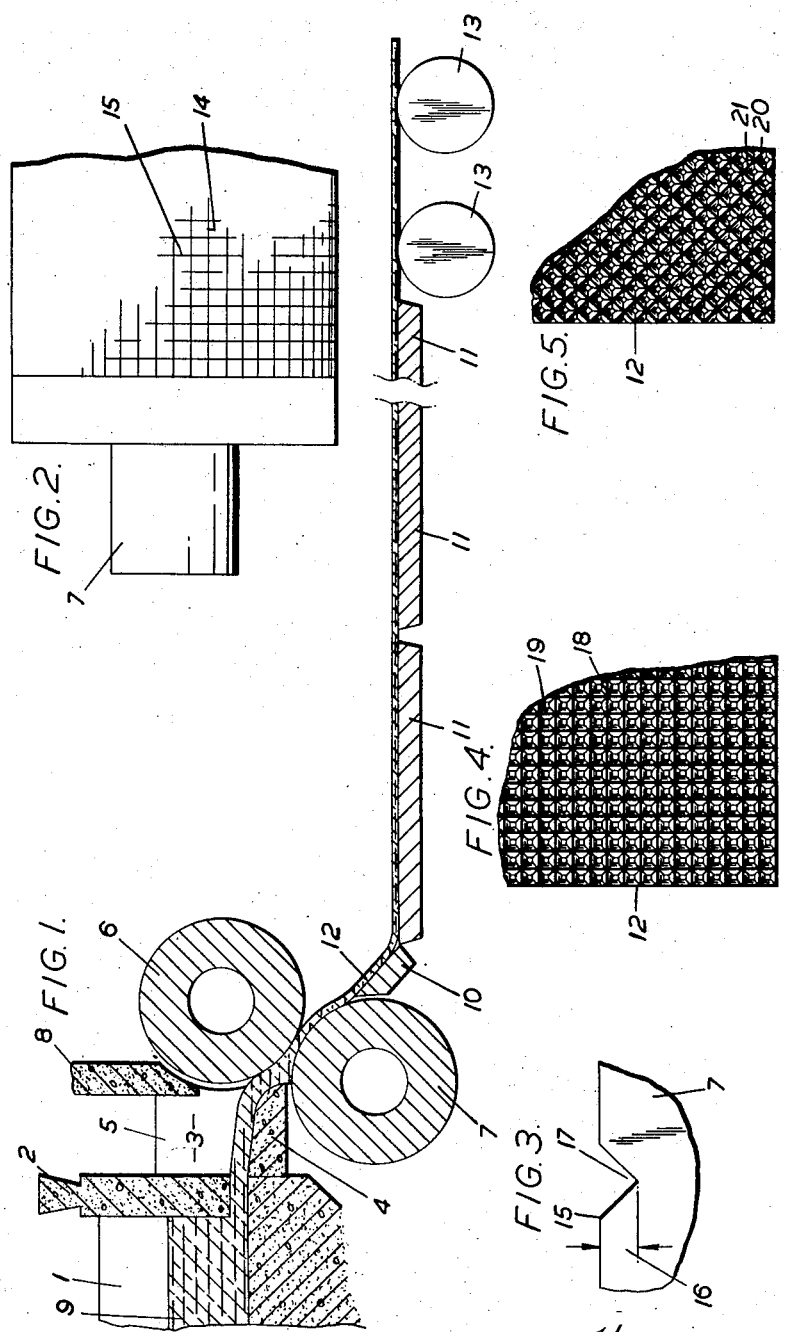
Inventors
Hubert C Wynne
Frank Cousen
By
Attorneys

United States Patent Office 2,883,799
Patented Apr. 28, 1959

2,883,799

MANUFACTURE OF OPAQUE GLASS IN RIBBON FORM

Hubert C. Wynne, Barnby Dun, near Doncaster, and Frank Cousen, St. Helens, England, assignors to Pilkington Brothers Limited, Liverpool, England, a corporation of Great Britain Application June 5, 1952, Serial No. 291,822

Claims priority, application Great Britain June 12, 1951

1 Claim. (Cl. 49—87)

This invention relates to the manufacture of opaque glass in ribbon form.

Sheets of slow setting type opaque glass have heretofore been produced by flowing the prescribed quantity of the metal on to a casting table on which the sheet is rolled to flat form. The surface of the metal which lies on the table is hereinafter referred to as the "reverse" face and the surface engaged by the roller is hereinafter referred to as the "obverse" face.

By slow setting type opaque glass is meant a glass having in its composition a low silica ($SiO_2$) e.g. 70% and low lime (CaO) e.g. 4% content.

The present invention has for its main object to devise a continuous method of producing opaque slow setting glass in ribbon form which shall be comparable in every respect with the opaque glass previously produced on a casting table.

Experiments have been conducted with the object of producing a ribbon of the vitreous material by passing the predetermined quantity of metal between casting rolls such as are used in the manufacture of flat glass formed from a quick setting composition, for example plate glass. However, unsuccessful results were obtained due, it is believed, to the slow setting quality of the glass employed, which characteristic permitted distortion as the ribbon left the rolls, which distortion appeared to be intensified as the reverse face was chilled on the ribbon arriving on the usual metal trays disposed in the path of the ribbon on its way to the lehr and on which the ribbon is necessarily cooled before entering the lehr.

Further experiments were carried out with a view to achieving such a degree of chilling on the reverse face by contact with the lower roll as to give sufficient rigidity to the ribbon to enable it to pass on from the rolls without distortion. In this case grooves were formed on the roll and they were about .08" deep and at a pitch of about four to the inch, the walls of the groove being mutually inclined and subtending an angle of 110° at the base of the groove.

However, the product produced, though free from cockling on the obverse face, showed the rib formation at the obverse face.

The present invention comprehends a method of manufacturing opaque glass in ribbon form from a slow setting glass composition which is characterised by forming intersecting sets of ribs of thread like nature on the reverse face of the ribbon as the ribbon is produced, the height of the ribs from the reverse face being about .03" to .06", the faces of the ribs being mutually divergent at an angle which may vary from about 135° to about 90°, each set of ribs being spaced at a pitch of about seven to the inch, the ratio of the total surface of the reverse face to the area of the obverse face being approximately between 1.1 to 1 and 1.4 to 1 whereby an accelerated cooling and setting of the glass in the ribs is achieved, and an integral stiffening mesh of chilled glass is produced on the reverse face during the formation of the ribbon.

By producing a ribbon of glass with integral intersecting ribs of thread like form in accordance with the invention, a grid system of reinforcement is produced on the reverse face which gives sufficient rigidity to the ribbon to allow it to move without distortion, such as would produce cockling, from the casting rolls to the trays or other support for the glass during its passage from the rolls to the lehr, and on arriving at the usual metal trays the reverse surface is spaced from the trays so that the heat exchange which follows on both the obverse and reverse faces is mainly a heat exchange with ambient atmosphere.

By such method of manufacture a slow setting vitreous ribbon is obtained which is free from cockling and the thread like ribbing on the reverse face is not visible at the obverse face.

The invention utilizes apparatus for producing a ribbon of glass from a slow setting type glass composition which is characterised by the association with means for melting the glass composition, of means for flowing the molten metal derived in the furnace between casting rolls, the lower of which is formed with intersecting grooves having walls which diverge from the base of the groove outwardly, at an angle which may vary between about 135° and about 90°, the depth of the grooves being equal, but which dimension may vary from between .03" to .06", the pitch of the grooves in each set of intersecting grooves being such that the ratio of total area of the ribbon in contact with the lower roll to the area in contact with the upper roll is approximately between 1.1 to 1 and 1.4 to 1.

In order that the invention may be more clearly understood one preferred embodiment thereof will now be described by way of example with reference to the accompanying diagrammatic drawings.

In the drawings:

Figure 1 shows in central sectional elevation the discharge end of a canal of usual form, leading from a glass melting tank furnace and connected to a spout associated with a pair of casting rolls, the lower one of which has intersecting grooves formed in the surface.

Figure 2 is a fragmentary elevation of the lower roll, shown in Figure 1, but to an enlarged scale to more clearly show the intersecting grooves which are formed on the lower roll, Figure 3 is also a fragmentary drawing to a still larger scale showing the preferred form of groove used in carrying out the invention, Figure 4 is a fragmentary plan view of the reverse face of a sheet of opaque glass having intersecting thread like ribs running longitudinally and transversely of the ribbon, and Figure 5 is a similar view showing the reverse face of a sheet in which the intersecting thread like ribs are oblique.

In the drawings like references designate the same parts.

Referring now to the drawings:

A canal of a continuous glass melting tank is indicated at 1, the tank being one which is charged with suitable batch material for the production of a slow setting glass, the regulating tweel is indicated at 2 and the spout at 3. The spout comprises a floor or lip 4 and side jambs 5, one of which only is illustrated in Figure 1, the side jambs and lip forming a spout of a generally regular cross section, on which spout a cover may be secured in known manner. Heaters may be incorporated in the side jambs, in the usual manner, to maintain the jambs at a high temperature to minimise the temperature gradient across the spout. Associated with the spout are a pair of water cooled casting rolls, the upper casting roll is indicated at 6, and the lower casting roll at 7, a gate 8 is adjustably suspended by means (not shown) in a vertical plane in contiguity with the casting roll 6.

The gate 8 may be adjusted to regulate the extent of contact with the roll 6 of the molten metal 9 flowing from the canal 1 of the spout lip 4 to the pass between the rolls 6, 7.

The upper casting roll 6 is disposed in advance of the lower casting roll 7 so that the molten metal 9 flows from the lip 4 on to an upper part of the roll 7 comprising a downwardly and forwardly directed arcuate casting bed moving in the same sense as the general direction of flow from the spout, so that the molten metal 9 on leaving the spout and arriving on this casting bed is constrained to flow forwardly, thereby preventing backward flow of the metal leaving the spout lip 4.

Forwardly of the lower casting roll 7 is arranged a metal support for the ribbon of glass emerging from the pass between the casting rolls 6 and 7. The support comprises an inclined member 10 and a series of horizontal members 11. The member 10 directs the ribbon 12 of glass leaving the casting roll 7 into a predetermined horizontal path prescribed for the ribbon by the disposition of the plane supports 11.

After leaving the supports 11 the ribbon 12 is carried by rollers 13 to an annealing lehr (not shown) in the well known manner employed in the treatment of a continuous ribbon of rolled flat glass.

The lower roll 7 is provided with two sets 14, 15 of intersecting grooves which meet each other at right angles so that a ribbon passing from the roll 7 has imparted to it a pattern in relief in the form of a rectilinear mesh. The set of grooves 14 are parallel to the axis of the roll and the set of grooves 15 are parallel circumferential grooves disposed in planes at right angles to the axis of the roll.

Accordingly, the ribbon 12 moving from the pass between the rolls 6, 7 and formed from the molten metal 9 has on its reverse face, that is the face which makes contact with the roller 7 and passes over the supports 10, 11 and 13, two sets of ribs, one set running longitudinally of the ribbon and the other set at right angles to the path of the ribbon.

The grooves 14, 15 in the construction described are about 0.035 inch in depth, that is to say in the dimension 16 shown in Figure 3, the sides of the grooves being equally inclined to the surface of the roll 7 and meeting at an angle of 110°, said angle being indicated at 17 in Figure 3.

In Figure 4 there is shown a fragment of the reverse face of a sheet of glass produced from the roll 7 having its reverse face formed as described with particular reference to Figures 2 and 3.

The ratio of the total area of the roll to the projected area is 1.25 to 1. By the total area of the roll is meant that area of the roll with which "the body" of the ribbon makes contact.

In the manufacture of clear flat glass from apparatus of the kind described with reference to Figure 1 there is always a wastage of a marginal portion to each side of the ribbon and the body of the ribbon is, in fact, the ribbon which is left after the marginal portions have been severed.

Instead of arranging the grooves as already described with reference to Figure 2 the intersecting grooves may comprise two sets of grooves which are oblique, and when employing a roll with oblique grooves, ribs will be formed on the reverse face of the ribbon of glass which are both inclined at about 45° to the edge of the ribbon and intersect each other at right angles, thereby providing a trellis-like reinforcement.

Figure 5 illustrates the reverse face of a sheet produced from a roll 7 having oblique grooves, and the sheet face comprising ribs 20 and 21 which intersect at right angles so as to produce a trellis-like rib formation in relief on the ribbon.

Very satisfactory results have been obtained by using apparatus as herein described, and ribbon of $5/16''$ thickness of a slow setting opaque glass has been produced without cockle and without the ribbing showing on the obverse face, whilst a very enhanced rate of production is attainable as compared with the rate of production when making the sheet material by casting on a table.

The thread like ribs which are produced in accordance with the invention form, by reason of their accelerated cooling and consequent setting, a sufficient reinforcement to the ribbon of slow setting glass, which is sufficiently flexible to allow the glass to follow the intended path on to the supports 11 and yet rigid enough to eliminate cockling.

Variations can be made from the dimensions already given with respect to the grooves 14 and 15 within the ambit of the present invention as defined in the claim appended hereto, and a table including such variations and grooves of the dimensions already described is set out hereunder:

| No. of ribs per inch | Angle, degrees | Depth, inches | Ratio, Total Area/Projected Area |
|---|---|---|---|
| 7 | 90 | 0.057 | 1.41 |
| 7 | 110 | 0.035 | 1.25 |
| 7½ | 112 | 0.045 | 1.21 |
| 7⅔ | 132 | 0.030 | 1.10 |

By the present invention a successful method of continuously producing a slow setting opaque glass in sheet form is obtained, and constitutes a notable advance in the production of such glass over that usual method of production in which the sheet is produced by casting on a stationary table.

We claim:

A continuous method of manufacturing opaque glass in ribbon form from a slow setting glass composition which comprises continuously drawing molten glass from a reservoir, continuously casting it in ribbon form and continuously feeding the formed ribbon towards a supporting surface, and forming by impression on the reverse face of the ribbon while in plastic form and while in transit towards said supporting surface intersecting sets of reinforcing ribs of thread like nature, the height of the ribs from the reverse face being about .03″ to .06″, the faces of the ribs being mutually divergent at an angle which may vary from about 135° to about 90°, each set of ribs being spaced at a pitch of about seven to the inch, the ratio of the total surface of the reverse face to the area of the obverse face being approximately between 1.1 to 1 and 1.4 to 1 whereby an accelerated cooling and setting of the glass in the ribs is achieved, and an integral stiffening mesh of chilled glass is produced on the reverse face during the continuous movement of the ribbon towards said supporting surface.

References Cited in the file of this patent

UNITED STATES PATENTS

| D. 44,948 | Walsh | Nov. 25, 1913 |
| 83,841 | Ferris | Nov. 10, 1868 |
| 370,176 | Brogan et al. | Sept. 20, 1887 |
| 1,928,026 | Nameche | Sept. 26, 1933 |

FOREIGN PATENTS

| 455,887 | Germany | Feb. 11, 1928 |